(12) United States Patent
Johnston et al.

(10) Patent No.: US 10,754,313 B2
(45) Date of Patent: *Aug. 25, 2020

(54) PROVIDING AUDIO AND ALTERNATE AUDIO SIMULTANEOUSLY DURING A SHARED MULTIMEDIA PRESENTATION

(71) Applicant: AT&T Intellectual Property I, L.P., Atlanta, GA (US)

(72) Inventors: Robert Johnston, Atlanta, GA (US); Kirk Kingsmill, Duluth, GA (US); James Wood, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,872

(22) Filed: Apr. 17, 2018

(65) Prior Publication Data

US 2018/0231944 A1 Aug. 16, 2018

Related U.S. Application Data

(63) Continuation of application No. 14/258,819, filed on Apr. 22, 2014, now Pat. No. 9,971,319.

(51) Int. Cl.
*G06F 17/00* (2019.01)
*G05B 15/02* (2006.01)
(Continued)

(52) U.S. Cl.
CPC ......... *G05B 15/02* (2013.01); *H04N 21/4104* (2013.01); *H04N 21/4307* (2013.01);
(Continued)

(58) Field of Classification Search
CPC ............ H04N 21/4307; H04N 21/8106; G10L 2021/0575; G06F 3/165
See application file for complete search history.

(56) References Cited

U.S. PATENT DOCUMENTS

| 5,440,351 A | 8/1995 | Ichino |
| 5,619,197 A | 4/1997 | Nakamura et al. |

(Continued)

FOREIGN PATENT DOCUMENTS

| JP | 2013516849 A | 5/2013 |
| WO | 2011028174 A1 | 3/2011 |
| WO | 2012028851 A1 | 3/2012 |

OTHER PUBLICATIONS

Morris, Meredith Ringel et al., "Individual Audio Channels with Single Display Groupware: Effects on Communication and Task Strategy", http://research.microsoft.com/enus/um/people/merrie/papers/indiv_audio.pdf, Nov. 2004.

(Continued)

*Primary Examiner* — Joseph Saunders, Jr.
(74) *Attorney, Agent, or Firm* — Guntin & Gust, PLC; Ralph Trementozzi

(57) ABSTRACT

Aspects of the subject disclosure may include, for example, decoding first and second encoded audio portions extracted from a digitally encoded data stream to obtain first and second decoded audio portions. The digitally encoded data stream includes an encoded video portion, multiple encoded audio portions including the first and second audio portions and a reference marker. The first and second decoded audio portions are synchronized to a decoded video portion based on the reference marker. The first decoded audio portion is forwarded to equipment of a first user and the second decoded audio portion is forwarded to equipment of a second user. Presentations of the first decoded audio portion by the equipment of the first user and the second decoded audio portion by the equipment of the second user are synchronized to a presentation of the decoded video portion. Other embodiments are disclosed.

20 Claims, 8 Drawing Sheets

(51) Int. Cl.
*H04N 21/41* (2011.01)
*H04N 21/43* (2011.01)
*H04N 21/434* (2011.01)
*H04N 21/4363* (2011.01)
*H04N 21/81* (2011.01)

(52) U.S. Cl.
CPC ... *H04N 21/4341* (2013.01); *H04N 21/43637* (2013.01); *H04N 21/8106* (2013.01)

(56) References Cited

U.S. PATENT DOCUMENTS

| | | | |
|---|---|---|---|
| 6,066,939 | A | 5/2000 | Nagai et al. |
| 6,483,568 | B1 | 11/2002 | Folio |
| 6,630,963 | B1 | 10/2003 | Billmaier |
| 7,454,776 | B1 | 11/2008 | Walker et al. |
| 8,179,475 | B2 | 5/2012 | Sandrew |
| 8,272,008 | B2 | 9/2012 | Meek et al. |
| 8,369,680 | B2 | 2/2013 | Whiteing |
| 8,582,565 | B1 | 11/2013 | Morsy et al. |
| 8,656,432 | B2 | 2/2014 | Sullivan et al. |
| 2004/0027496 | A1 | 2/2004 | Morales |
| 2006/0156374 | A1* | 7/2006 | Hu .......... H04N 7/163 725/135 |
| 2006/0161835 | A1 | 7/2006 | Panabaker et al. |
| 2008/0063215 | A1 | 3/2008 | Porwal et al. |
| 2008/0077965 | A1 | 3/2008 | Kamimaki et al. |
| 2008/0130924 | A1 | 6/2008 | Vaudrey et al. |
| 2009/0248794 | A1 | 10/2009 | Helms et al. |
| 2012/0274850 | A1 | 11/2012 | Hawkins et al. |
| 2012/0307149 | A1 | 12/2012 | Meek et al. |
| 2012/0311642 | A1 | 12/2012 | Ginn et al. |
| 2013/0155318 | A1 | 6/2013 | Boden et al. |
| 2013/0202024 | A1 | 8/2013 | Suzuki et al. |
| 2013/0272672 | A1 | 10/2013 | Padro Rondon et al. |
| 2014/0022454 | A1 | 1/2014 | Oh |
| 2014/0022456 | A1 | 1/2014 | Casagrande et al. |
| 2015/0078595 | A1 | 3/2015 | Shintani et al. |

OTHER PUBLICATIONS

Stewart, Jason et al., "Single Display Groupware: A Model for Co-present Collaboration", HCIL Technical Report No. 98-14 (Dec. 1998); http://www.cs.umd.edu/hcil.

* cited by examiner

100

200

400

600

PROVIDING AUDIO AND ALTERNATE AUDIO SIMULTANEOUSLY DURING A SHARED MULTIMEDIA PRESENTATION

CROSS REFERENCE TO RELATED APPLICATIONS

This application is a continuation of U.S. application Ser. No. 14/258,819, filed Apr. 22, 2014, which is incorporated by reference herein in its entirety.

FIELD OF THE DISCLOSURE

The subject disclosure relates to providing alternate audio simultaneously during a shared multimedia presentation.

BACKGROUND

Multimedia presentation systems generally receive digitally encoded multimedia content in the form of a transport stream, e.g., from a broadcast service provider, or a program stream from stored content, e.g., from a digital video player or from a stored media file. The digitally encoded multimedia content generally includes a video portion and one or more corresponding audio portions. The audio portions can include a soundtrack corresponding to the video portion. Different audio tracks can provide the same soundtrack according to different audio protocols, such as stereo, surround sound and the like.

The video portion and a corresponding audio portion can be separated and processed independently in preparation for presentation. During presentation, the processed video portion and audio portion preferably appear to be synchronized to each other.

BRIEF DESCRIPTION OF THE DRAWINGS

Reference will now be made to the accompanying drawings, which are not necessarily drawn to scale, and wherein.

DETAILED DESCRIPTION

Figure 1:
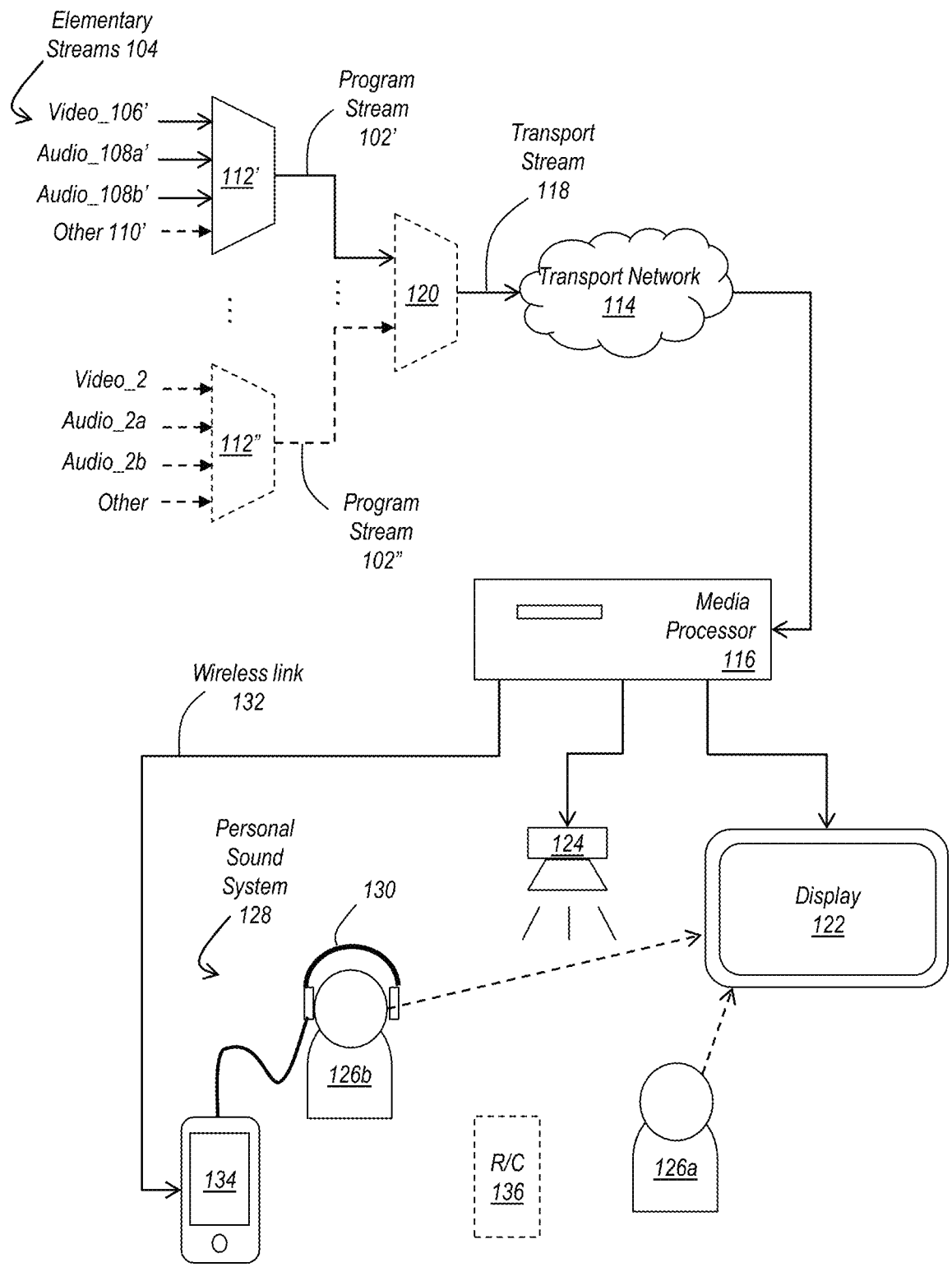
FIG. 1 depicts an illustrative embodiment of a multimedia presentation system.

The subject disclosure describes, among other things, illustrative embodiments for obtaining from an encoded data stream a common video portion and different audio portions, and providing the different audio portions to allow a non-disruptive presentation of the common video portion. Other embodiments are described in the subject disclosure.

One or more aspects of the subject disclosure include a media processor that decodes a video data stream together with multiple audio data streams simultaneously, forwarding the decoded data streams to sound systems allowing different viewers to observe the same video presentation, while separately perceiving corresponding different audio.

One embodiment of the subject disclosure includes process that includes receiving, by a system including a processor, a digitally encoded data stream. The data stream includes an encoded video data portion, multiple encoded audio data portions and a synchronization marker. A first encoded audio data portion is extracted from the digitally encoded data stream and decoded to obtain a first decoded audio portion. A second encoded audio data portion is extracted from the digitally encoded data stream and decoded to obtain a second decoded audio portion. The first decoded audio portion and the second decoded audio portion are synchronized to a decoded video portion obtained from the encoded video data portion based on the synchronization marker. The first decoded audio portion is forwarded to equipment of a first user and the second decoded audio portion is forwarded to equipment of a second user. Presentations of the first decoded audio portion by the equipment of the first user and the second decoded audio portion by the equipment of the second user are synchronized to a presentation of the decoded video portion.

Another embodiment of the subject disclosure includes media processor includes a memory that stores executable instructions and a processor coupled to the memory. The processor, responsive to executing the instructions, facilitates performance of operations including extracting a first encoded audio portion from a digitally encoded data stream having an encoded video portion, multiple encoded audio portions and a timing reference. The first encoded audio portion is decoded to obtain a first decoded audio portion. A second encoded audio portion is extracted from the digitally encoded data stream and decoded to obtain a second decoded audio portion. The first decoded audio portion and the second decoded audio portion are synchronized based on the timing reference to a decoded video portion obtained from the encoded video portion. The first decoded audio portion is forwarded to equipment of a first user and the second decoded audio portion is forwarded to equipment of a second user. Presentations of the first decoded audio portion by the equipment of the first user and the second decoded audio portion by the equipment of the second user are synchronized to a presentation of the decoded video portion.

Yet another embodiment of the subject disclosure includes a machine-readable storage medium, including executable instructions which, responsive to being executed by a processor, cause the processor to facilitate performance of operations. The operations include decoding a first encoded audio portion extracted from a digitally encoded data stream to obtain a first decoded audio portion. A second encoded audio portion is also extracted from the digitally encoded data stream to obtain a second decoded audio portion. The digitally encoded data stream includes an encoded video portion, multiple encoded audio portions and a reference marker. The first decoded audio portion and the second decoded audio portion are synchronized to a decoded video portion based on the reference marker. The first decoded audio portion is forwarded to equipment of a first user and the second decoded audio portion is forwarded to equipment of a second user. Presentations of the first decoded audio portion by the equipment of the first user and the second decoded audio portion by the equipment of the second user are synchronized to a presentation of the decoded video portion.

FIG. 1 depicts an illustrative embodiment of a multimedia presentation system 100. A first digitally encoded data stream, referred to in the illustrative example as a program stream 102', is formed by a combination of elementary streams 104. In the illustrative example, the elementary streams 104 include an elementary video stream 106', a first elementary audio stream 108a' and a second elementary audio stream 108b'. In at least some embodiments, other elementary streams 110' are included. A first data stream combiner 112' combines the elementary streams 106', 108a', 108b', 110' into the first program stream 102'. The first program stream 102' can represent digitally encoded multimedia associated with a particular program, such as a broadcast program, or a previously stored program, such as a digital video recording and/or a multimedia file.

The program stream 102' can be transported over a transport network 114 to a media processor 116. In at least some embodiments, the program stream 102' is implemented within a transport stream container format 118. A transport stream container format can include features suited to packet data transport in which the transported data packets are subject to data transport issues, such as variable delays and/or packet loss.

In some embodiments, the program stream 102' can be combined by one or more other program streams 102", each having its own respective elementary streams 106", 108a", 108b", 110". By way of illustrative example, the first program stream 102' corresponds to a first channel of a broadcast service provider and the second program stream 102" corresponds to a second channel of the broadcast service provider. Each of the program streams 102', 102" are combined or otherwise merged at a program stream combiner 120 into the single transport stream 118.

The media processor 116 can be tuned or otherwise configured to extract a particular program stream 102', 102" from the transport stream 118. The media processor 116 can be further configured to extract one or more of the elementary streams 106', 108a', 108b', 110' for presentation. In the illustrative example, a video portion of a multimedia program is extracted from the first program stream 102' and processed, as required, for presentation at a display device 122. Similarly, a first audio portion 108a' of the same multimedia program is extracted from the first program stream 102' and processed, as required, for presentation at a shared sound system 124, such as a home theater audio entertainment system including one or more speakers. A first user 126b, when positioned within a viewing range of the display device 122 and within an audio range of the shared sound system 124, experiences the audio-visual presentation of the video portion and the first audio portion.

The media processor 116 can be further configured to extract one or more of the other elementary streams 106', 108a', 108b', 110', such as the second elementary audio stream 108b' for localized presentation at equipment of a second user 126b also within viewing range of the display device 122. In the illustrative example, the second audio portion 108b' of the same multimedia program is extracted from the first program stream 102' and processed, as required, for presentation at a personal sound system 128. The personal sound system 128 allows the second user 126b to experience the second audio portion. A first user 126b within viewing range of the display device 122 and within audio range the shared sound system 124 is able to experience the audio-visual presentation of the video portion and the second audio portion.

Preferably, one or more of the shared sound system 124 and the personal sound system 128 are configured such that the first and second users 126a, 126b can observe the same video content from the same display device 122, each enjoying their respective different audio portion without interfering with the audio portion of the other. In the illustrative example, the personal sound system 128 includes headphones 130 providing a localized presentation of the second audio portion to the ears of the second user 126b, while simultaneously providing audio isolation or otherwise muting presentation of the first audio portion from the shared sound system 124.

The second audio portion determined by the media processor 116 can be distributed to the headphones 130 directly via a cabled connection between the media processor 116 and the headphones. For example, a connector portion of cabled headphones 130 can be plugged into a corresponding connection portion of an audio interface of the media processor 116 providing the second audio portion. Alternatively or in addition, the second audio portion can be distributed to the headphones via a wireless link 132. The wireless link can employ any of various wireless communication protocols, including any of those disclosed herein, such as wireless fidelity (WiFi), Bluetooth®, Zigbee® and/or Digital Enhanced Cordless Telecommunications (DECT) wireless protocols, to transport the second audio portion from the media processor 116 to the headphones 130. (Bluetooth® and ZigBee® are trademarks registered by the Bluetooth® Special Interest Group and the ZigBee® Alliance, respectively)

In the illustrative example, the wireless link 132 is established between the media processor 116 and a mobile device 134. The headsets 130 are in wired and/or wireless communication with the mobile device 134. The mobile device 134 can include one or more of a mobile telephone, a smartphone, a cordless telephone handset, a personal media player, such as an iPod® media player, a laptop computer, a tablet device, such as an iPad® tablet device.

One or more of the media processor 116, the display device 122 and the mobile device 134 can include a user interface, such as a button, a keypad, or a touchscreen display. Alternatively or in addition, one or more of the media processor 116, the display device 122 and the mobile device 134 can be controlled by a remote control device 136. The remote control device can include any of various remote control protocols to allow one or more of the first and second users 126a, 126b to operate one or more of the media processor 116, the display device 122 and the mobile device 134. Such controllable features can include selection of one or more of a program stream 102', 102" of the transport stream 118 and/or selection of one or more of the elementary streams 104 of a chosen or otherwise selected program stream 102', 102".

Figure 2:
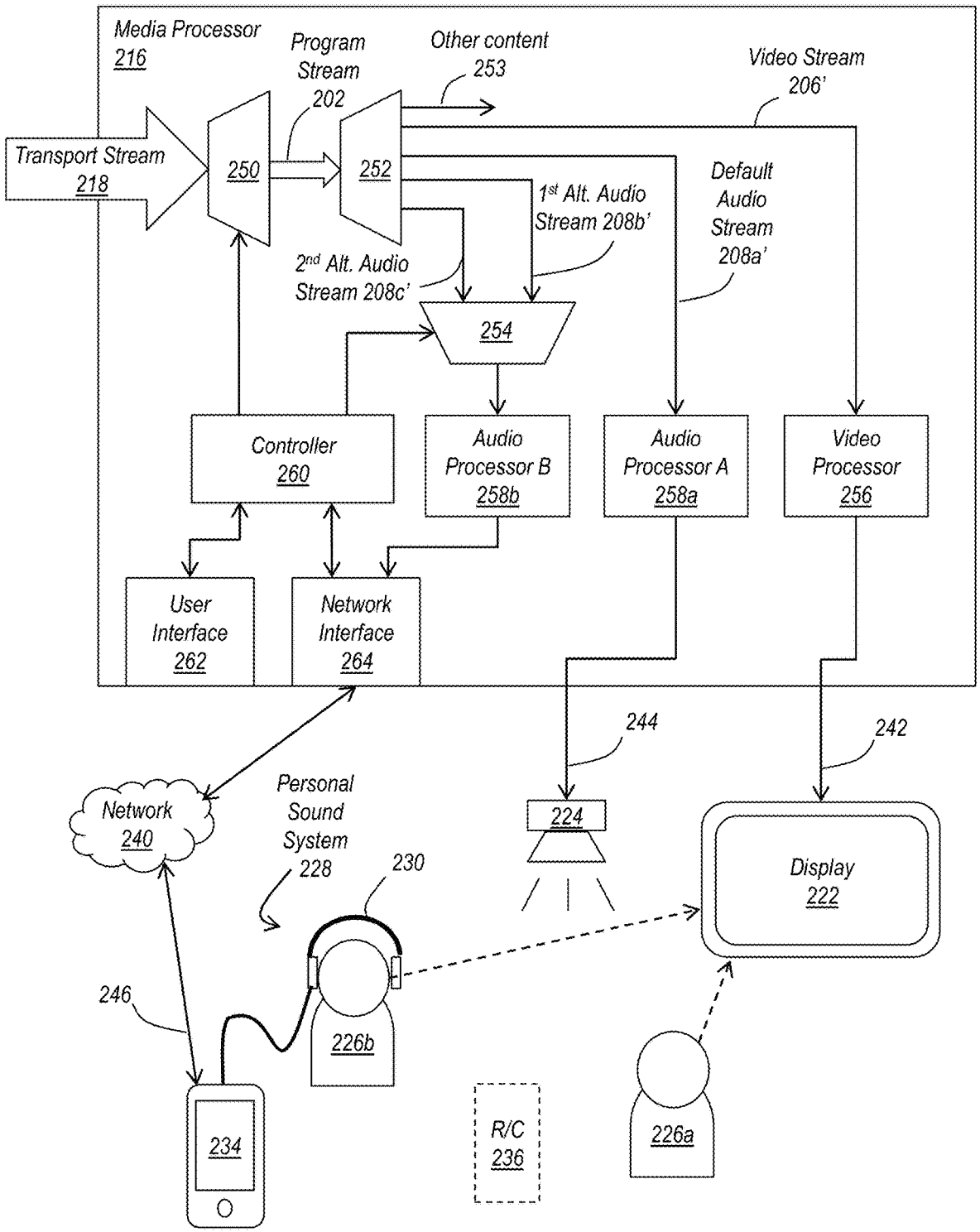
FIG. 2 depicts in more detail the multimedia presentation system of FIG. 1.

FIG. 2 depicts an illustrative embodiment of another multimedia presentation system 200. The system 200 includes a media processor 216, a display device 222, a shared audio system 224, a wireless network 240 and a personal sound system 228 including a headset 230 and a mobile device 234. In some embodiments, the system also includes a controller, such as a remote controller 236 to control one or more of the media processor 216, the display device 222 or the shared sound system 228.

The media processor 216 receives a multimedia transport stream 218 including multimedia content for one or more programs. The media processor 216 extracts, decodes or otherwise processes the transport stream 218 to extract one or more programs and for each program to produce at least decoded video portion 242, a first decoded audio portion 244 and a second decoded audio portion 246. In at least some embodiments, the media processor 216 also extracts other content 235, such as subtitles, descriptive audio, metadata and the like. Although the illustrative example refers to receiving a transport stream 218, it is understood that the media processor 216 can receive a program stream from another source, such as a local digital video recorder (DVR) or player, stored multimedia files, and the like. Such program files, e.g., from local source such as the DVR, may not require transport encoding.

The decoded video portion is ultimately forwarded to the video display device 222 for presentation thereupon. Likewise, the first decoded audio portion is forwarded to the shared audio system 224 for presentation thereupon. Simultaneously, the media processor 216 forwards the second decoded audio portion 226 to the personal audio system 228 by way of the wireless network 240. For illustrative purposes, the display device 222 and the shared sound system 224 are sometimes referred to as equipment of the first user 226a; whereas, the personal sounds system 228 is referred to as equipment of the second user 226b.

Preferably, one or more of the shared audio system 224 and the personal audio system 228 are configured such that the first and second users 226a, 226b can observe the same video content from the same display device 222, each listening to their respective different audio portion without interfering with the audio portion of the other. The headphones 130 provide a localized presentation of the second audio portion 246 to the ears of the second user 226b, while simultaneously providing audio isolation or otherwise muting presentation of the first audio portion 244 from the shared audio system 124.

In some embodiments, the equipment of the first user 226a also includes a personal sound system, e.g., similar to the personal sound system 228 of the second user 226b. Multiple personal sound systems 228 can be included with or without a shared audio system 224. By way of non-limiting example, a system 200 having one or more personal audio systems 228 with or without a shared audio system 224 can be used in media presentations to large groups, e.g., in a projection theater, a class room, a business meeting, and the like. Individual users or groups of users at a common video presentation can be presented with an alternative audio presentation without detracting from another alternative audio presentation and/or a default audio presentation.

According to the illustrative example, the media processor 216 includes a transport stream demultiplexer 250, a program stream demultiplexer 252, and an alternative audio selector 254. The transport stream demultiplexer 250 has in input receiving the transport stream 218 and an output in communication with an input of the program stream demultiplexer 252. The transport stream demultiplexer 250 may or may not be included for systems 200 dedicated to presentation multimedia received without transport layer encoding, e.g., obtained from a local storage device, such as a digital video disk (DVD) or a memory. The program stream demultiplexer 252 has a first output in communication with an input of a video processor 256, and a second output in communication with an input of a first audio processor 258a. In some instances, the first audio processor 258a is referred to as a default audio processor 258a processing a first or default audio stream 208a'.

The program stream demultiplexer 252 has one or more additional outputs in communication with inputs of the alternative audio selector 254. An output of the alternative audio selector 254 is in communication with an input of a second audio processor 258b. It is understood that applications having one primary audio and one alternative audio may not require the alternative audio selector 254. In such instances, the alternative audio, e.g., the $1^{st}$ alternative audio stream 208b' would be in communication with the second audio processor 258b.

The system 200 also includes a controller 260, a user interface 262 and a network interface 264. The controller 260 is in communication with one or more of the transport stream demultiplexer 250, the alternative audio selector 254, the user interface 262 and the network interface. In operation, the controller, e.g., in response to instructions received by one or more of the user interface 262 or the remote controller 236, provides a program selection input to the transport stream demultiplexer. The transport stream demultiplexer provides a selected program stream 202' to an input of the program stream separator, e.g., a demultiplexer 252. The program stream demultiplexer 252 demultiplexes or otherwise separates or extracts the multiple elementary streams from the program stream 202.

Figure 3:
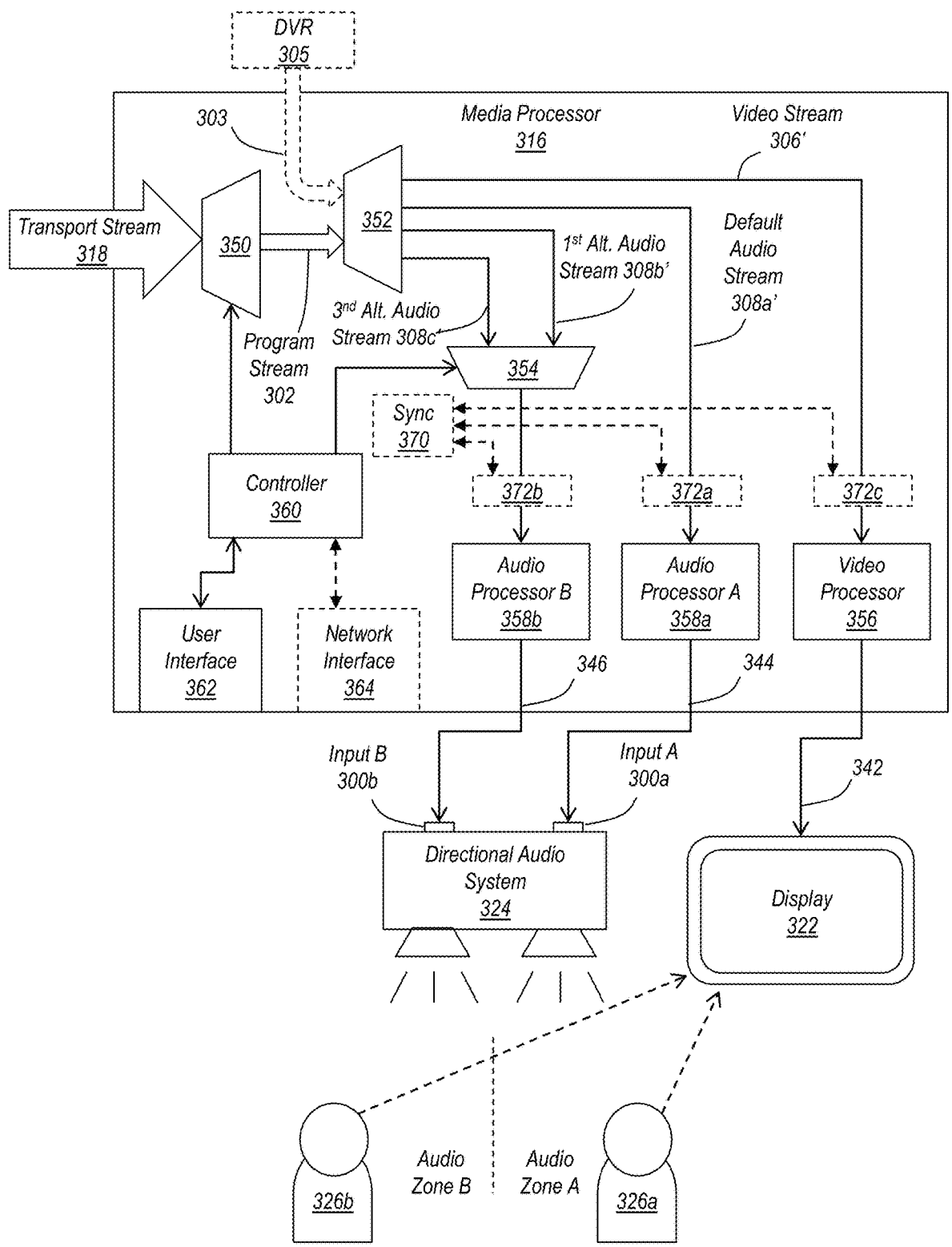
FIG. 3 depicts an illustrative embodiment of an alternative embodiment of a media processor of the multimedia presentation system of FIG. 1.

FIG. 3 depicts an illustrative embodiment of an alternative embodiment of a media processor of the multimedia presentation system of FIGS. 1 and 2. The system 300 includes a media processor 316, a display device 322 and a directional audio system 324. The media processor 316 receives a multimedia transport stream 318 including multimedia content for one or more programs. The media processor 316 extracts, decodes or otherwise processes the transport stream 318 to extract one or more programs and for each program to produce at least decoded video portion 342, a first decoded audio portion 344 and a second decoded audio portion 346. Although the illustrative example refers to receiving a transport stream 318, it is understood that the media processor 316 can receive a program stream 303 from another source, such as a local digital video recorder (DVR) 305 or player, stored multimedia files, and the like.

The decoded video portion 342 is ultimately forwarded to the video display device 322 for presentation. Likewise, the first decoded audio portion 344 is forwarded to the directional audio system 324. Simultaneously, the media processor 316 forwards the second decoded audio portion 346 to the directional audio system 324. The decoded audio, be it default or alternative, can be distributed to audio presentation equipment according to any of various formats, such as digital audio, analog audio, wireless radio, etc. In at least some embodiments, one or more of the default audio or the alternative audio are forwarded to a communication device, such as the personal mobile device 234, e.g., as a telephone call. The telephone call can be established using one or more of a circuit switched communication network, a packet switched packet network, e.g., VoIP, and/or a cellular mobile network.

The directional audio system 324 can be configured such that the first and second users 226a, 226b can observe the same video content from the same display device 322, each listening to their respective different audio portion without interfering with the audio portion of the other. Presentation of the different audio portions are directed to different spatial regions in the viewing range of the display device 322. For example, a left half of a room, designated as Zone B, is presented with the alternative audio content 346; whereas, the right half of the room, designated as Zone A, is presented with the primary audio content 344. Although two such zones are disclosed in the illustrative example, it is understood that additional zones can be configured, e.g., according to shapes including wedges, rectangles, circles, polygons, and the like. Such listening zones can be isolated by techniques generally known in the art, e.g., through constructive and destructive interference of acoustic waves. Interference patterns can be controlled according to one or more of speaker arrangements, room configuration or layout and signal phasing of the audio signals.

In the illustrative examples, the elementary streams of a particular program are obtained from a common program stream. The program stream and/or one or more of the elementary streams can include one or more synchronization markers. The synchronization markers can be included during a production phase of the program, e.g., in a metadata portion of the program or one or more of the elementary streams to synchronizing a soundtrack to a corresponding video. Alternatively or in addition, one or more synchronization markers can be included during a post-production phase, e.g., in a metadata portion of the program or one or more of the elementary streams. Such post-production synchronization markers can be used to synchronize other content, such as subtitles and/or descriptive audio, to one or more of the video or the soundtrack. Still other synchronization markers can be inserted, alternatively or in addition, during transport phase, e.g., during a packetization/de-packetization process.

Any such markers can be used by one or more components of the media processor 316 to ensure a substantially synchronized presentation of the video and its corresponding audio and/or other content. Synchronization should generally be sufficient to avoid what is generally known as "lip sync error." Some sources suggest that to avoid lip sync error, audio should lead video by no more than 15 milliseconds and audio should lag video by no more than 45 milliseconds. Some sources also suggest that for filmed content, acceptable lip sync is considered to be no more than 22 milliseconds in either direction.

Reduction of timing errors, or audio-video synchronization, can be addressed by any one of various generally well understood techniques. By way of illustrative example, the media processor 316 optionally includes a synchronization control module 370, and three delay devices 372a, 372b, 372c. A first delay device 372a can be positioned between the first audio processor 358a and the program demultiplexer 352, as shown, to delay the default audio stream 308a'. Alternatively or in addition, the first delay device 372a can be positioned between the first audio processor 358a and the directional audio system 324 to delay the default audio content 344. In some embodiments, a first audio delay introduced by the first delay device 372 is fixed, e.g., according to a calibrated or otherwise determinable delay. Such delay can result from processing delay differences, e.g., between the video processor 356 and the first audio processor 358a. Alternatively, the first audio delay can be adjusted according to a control signal or similar command from the synchronization control module. Similar delays can be introduced in like manners to one or more of the video stream 306', the video content 342, the first alternate audio stream 308b or the first alternate audio content 346.

Such delay control can be determined, e.g., by the synchronization control module 370, by monitoring synchronization markers observable in one or more of the decoded elementary streams. A loss of synchronization or timing error between any two elementary streams can be corrected by adjusting a delay to the one of the elementary streams leading the other. In such applications, the adjusted delay is equivalent to the timing or synchronization error, such that application of the delay to the leading stream causes the streams to be synchronized. As the delay can vary in at least some applications, the synchronization controller 370 can use feedback loops or similar servo control techniques to adjust a delay in response to a measured timing and or synchronization error in order to eliminate or reduce the error to an acceptable value. The delay devices 372a can include any suitable devices, such as digital delays, analog delays, tape loop delays, and the like.

Figure 4:
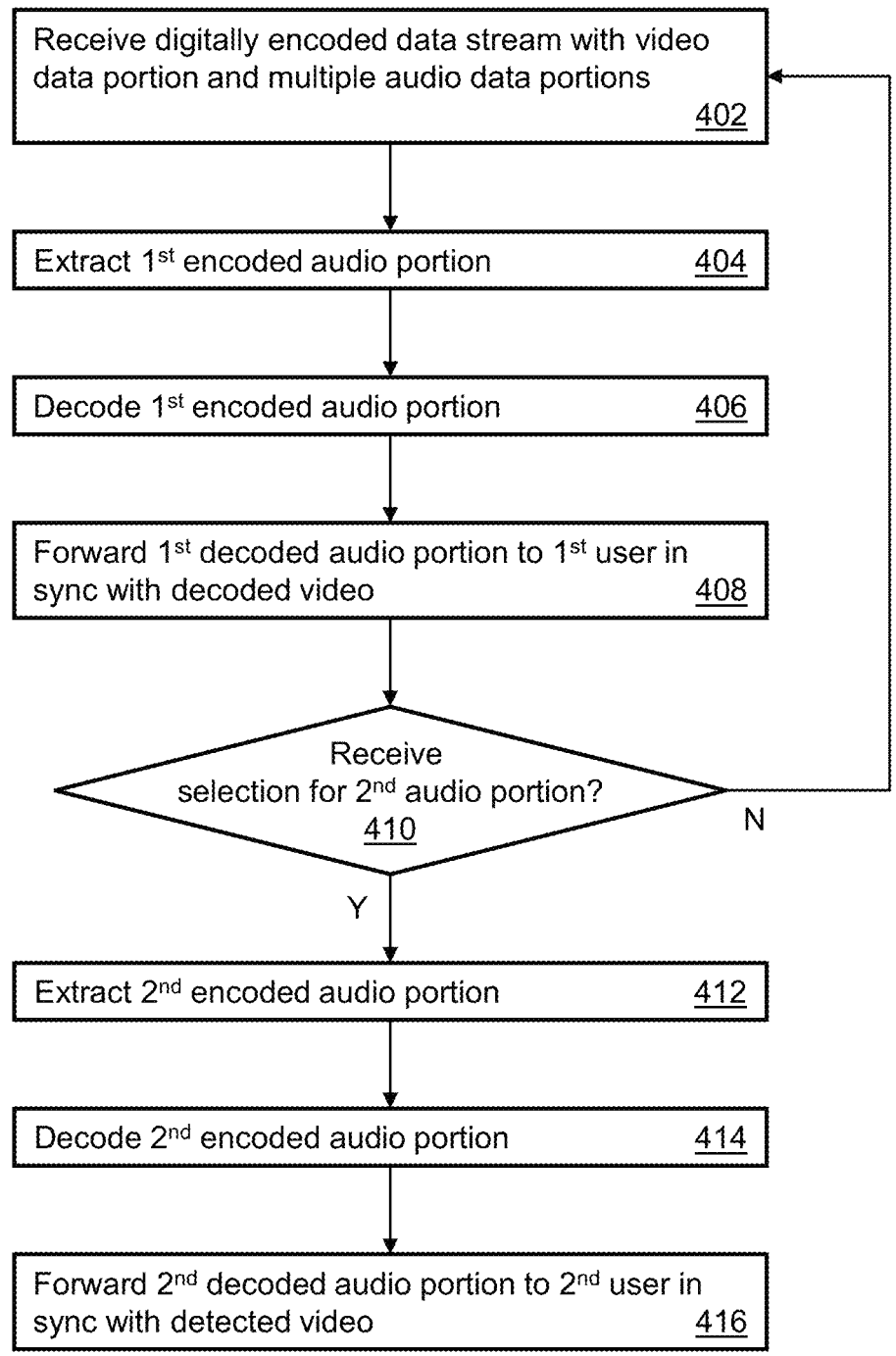
FIG. 4 depicts an illustrative embodiment of a method used in portions of the system described in FIGS. 1-3.

FIG. 4 depicts an illustrative embodiment of a process 400 used in portions of the systems described in FIGS. 1-3. A digitally encoded data stream 118, 218, 318 is received at 402. The digitally encoded data stream can be obtained locally, e.g., from storage media such as a memory or a DVD, or remotely, e.g., from a network. Networks, without limitation, include any of the various networks disclosed herein, such as terrestrial networks, cable networks, satellite networks, private networks, the Internet and the like. The digitally encoded data streams includes a video data portion 106, 206, 306 and multiple corresponding audio data portions 108a', 108b', 208a, 208b, 308a, 108b.

By way of non-limiting example, the data stream can be digitally encoded according to a protocol, such as the Real-time Transport Protocol (RTP), a standardized packet format for delivering audio and video over IP networks, or any of the MPEG protocols, e.g., any of the MPEG transport protocols, of the Moving Picture Experts Group. The audio data portions can be encoded or otherwise compressed using an audio codec, such as MP3, Vorbis or AAC. Similarly, the video portion can be encoded or otherwise compressed using a video codec, such as H.264 or VP8. The encoded video and audio content can be packetized for transport from a storage device and/or for transport over a network subject to packet loss and/or latency issues.

A first encoded audio portion is extracted from the transport stream at 404. Such extraction can be accomplished, e.g., using a digital demultiplexer 252, 352 to separate the encoded audio portions from the encoded video portion and from each other. The first encoded audio portion is decoded at 406. Decoding can be accomplished by the audio processors 258a, 258b, 358a, 358b, e.g., to reverse the encoding and/or compression used during a corresponding encoding process prior to storage and/or transport.

The first decoded audio portion is forwarded to equipment of a first user at 408. Preferably, the forwarded decoded audio portion is in synchronization with the decoded video to avoid or otherwise eliminate lip sync error. As disclosed herein, the equipment of the first user can include one or more of a shared sound system 224, a directional audio system 324, and a personal audio system, e.g., similar to the examples of personal audio system 128, 228 of the second user.

Determine whether a selection for a second audio portion has been received at 410. To the extent the selection was not received, continue to receive the digitally encoded data stream at 406, extract the first encoded audio portion at 404, decode the first encoded audio portion at 406 and forward the first decoded audio portion to the equipment of the first user at 408.

In at least some embodiments, applications providing alternative audio streams provide for a selection of the alternative audio stream. For example, equipment of the second user 126b, 226b, 326b can make its presence known to the media processor 116, 216, 316, e.g., by a registration process, a handshake process, or any other suitable means for identifying itself to the media processor. Alternatively or in addition, a set of options can be presented, e.g., by a menu setting or other suitable configuration interface. Such configuration interfaces can be displayed, e.g., by the display device 122, 222, 322 during the configuration or set up. Alternatively or in addition, such configuration interfaces can be displayed on one or more of a front panel display of the user interface 262, 362 of the media processor 216, 316, equipment of the second user, such as the mobile or personal communication device 134, 234, and/or at a portal or other similar web interface, e.g., hosted on a remote server.

To the extent that the selection was received at 410, a second encoded audio portion is extracted at 412 and decoded at 414. The second decoded audio portion is forwarded to equipment of a second user in sync with the detected video at 416.

In some embodiments, the alternative audio can be selected from among a number of available options. These options can include one or more different languages, e.g., English, Spanish, French, Chinese. Alternatively or in addition, the options can include one or more alternative audio presentations. By way of non-limiting example, such alternative audio presentations can include presentations adapted to individuals having hearing impairments. Accordingly, alternative audio streams can be prepared before transport stream delivery, e.g., during a production phase and/or a post-production phase. The alternative audio streams can be provided together with a default audio stream, e.g., for non-hearing impaired individuals, and a corresponding audio portion. Upon selection, the alternative audio stream can be directed to the equipment of the second user or directly to the second user by way of a common directional audio system, allowing different users/viewers to observe the same video presentation, e.g., from the same display device 122, 222, 322 within the same venue or room (e.g., a common presentation venue). According to the techniques disclosed herein, the different viewers are able to listen to different audio portions without interfering with each other.

Alternative audio content can be prepared, e.g., with the dialog accentuated with respect to other background sounds and/or musical scores of a particular program. Such preparations can be produced by adjusting or otherwise mixing different audio tracks accordingly. Alternatively or in addition, a separate dialog, distinct from an original program production, can be prepared or otherwise separately recorded.

Alternative audio content can also include post-processed versions of the original audio content of a particular program. For example, the sound track can be filtered to accentuate or otherwise emphasis one or more of high frequency content or low frequency content. Other techniques can include filtering to reduce or otherwise eliminate impulsive noise.

In at least some embodiments, more than one of the alternative audio content are selected for simultaneous presentation to equipment of the second user. Such simultaneous presentations can be selected by any of the various configuration and setup techniques disclosed herein, to provide a personalized audio presentation. For example, audio content can contain an original soundtrack corresponding to the video content. The original sound track might contain one or more of an original musical score, background noise/sounds, and dialog. The mixing is generally accomplished during production into the original soundtrack. It is envisioned that one or more of producers and/or other third parties, including individuals, can post-produce alternative audio content. This can include one or more of alternative musical scores, background noise/sounds, and dialog. Such alternative audio content allows for a personalized presentation that can enhance a particular program, e.g., according to a viewer's personal likes and dislikes.

Consider a personalized sound track in which a third party, such as an individual, or a sound recording entity prepares an alternative musical score that is synchronized to the video portion of a particular program. Other modifications include a personalized voicing of dialog, e.g., including parodies, that are synchronized to the video portion. An end user or viewer can make selections of particular alternative audio content to achieve a desired mix or combination of alternative audio content.

System configurations that allow an end user to select more than one elementary stream can include, e.g., within the media processor, multiple audio decoders followed by an audio mixer. Consider the audio selector 354 of FIG. 3 allowing for selection of more than one of the alternative audio streams. Each of the selected audio streams would be provided to an independent audio processor 358b and mixed before being presented to an audio/sound system.

Figure 5:
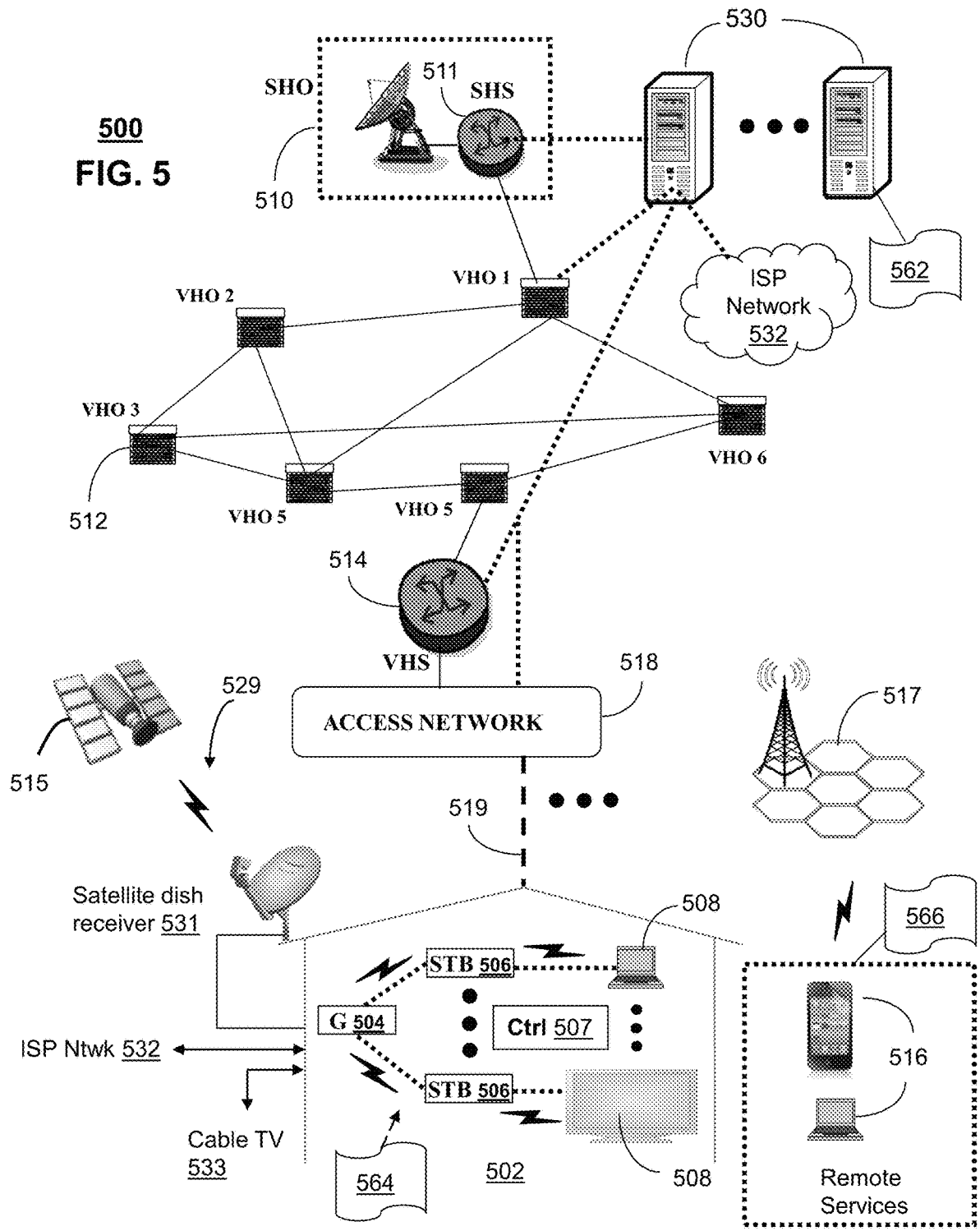
FIGS. 5-6 depict illustrative embodiments of communication systems that provide media services including services of the multimedia presentation system of FIGS. 1-3.

FIG. 5 depicts an illustrative embodiment of a first communication system 500 for delivering media content. The communication system 500 can represent an Internet Protocol Television (IPTV) media system. Communication system 500 can be overlaid or operably coupled with the multimedia presentation systems 100, 200, 300 of FIGS. 1, 2 and/or 3, as another representative embodiment of communication system 500. For instance, one or more devices illustrated in the communication system 500 of FIG. 5, such as the media processors 506 and/or the gateway 504, can be used to decode first and second encoded audio portions extracted from a digitally encoded data stream to obtain first and second decoded audio portions, and to synchronize the first and second decoded audio portions to a decoded video portion of the stream based on a reference marker. The first decoded audio portion is forwarded, e.g., by the media processors 506 and/or the gateway 504, to equipment of a first user, such as the media, e.g., display, device 508, and the second decoded audio portion is forwarded to equipment of a second user, such as one or more of the remote or wireless communication devices 516. Presentations of the first decoded audio portion by the equipment of the first user and the second decoded audio portion by the equipment of the second user are synchronized to a presentation of the decoded video portion, e.g., when the remote devices are within a viewing distance of the display device 508.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

The communication system 500 can also provide for all or a portion of the computing devices 530 to function as an application server (herein referred to as server 530). The server 530 can use computing and communication technology to perform one or more functions 562, which can include among other things, the techniques of presenting available different audio selections, e.g., during a configuration and/or selection process, described by method 400 of FIG. 4. Alternatively or in addition, the functions 562 can include a related feature ordering and/or billing process. For example, one or more available alternative audio streams can be provided to an individual, a household, a business, etc., according to individualized selection(s) or bundled package(s). Billing can be determined according to the particular selection(s)/package(s).

In at least some instances, the functions 562 can include functions related to the generation and/or processing of one or more alternative audio streams. For example, the functions 562 can include audio and/or signal processing. The audio processing functions 562 can be used, e.g., to obtain a translation of a dialog portion of a multimedia program. The translation can be prepared for a-la-carte ordering, or according to a prescribed alternative language or languages. The translation can be performed, e.g., according to a machine or otherwise automated translator, which can be predetermined or responsive to a user selection. Alternatively or in addition, the audio and/or signal processing functions 562 can be used, e.g., to obtain a modified version of a soundtrack or a portion of a soundtrack, such as a dialog, a musical score and/or sound effects/background noise. Such processing can be implemented to prepare a modified audio portion that is better suited for a person with a hearing impairment, or simply according to a user preference.

The media processors 506 and wireless communication devices 516 can be provisioned with software functions 564 and 566, respectively, to utilize the services of alternative audio server 530. For instance, functions 564 and 566 of media processors 506 and wireless communication devices 516 can be similar to the functions described for one or more of the media processor 116, 216, 316, mobile or personal communication device 134, 234 of FIGS. 1, 2 and 3, in accordance with the method 400 (FIG. 4).

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
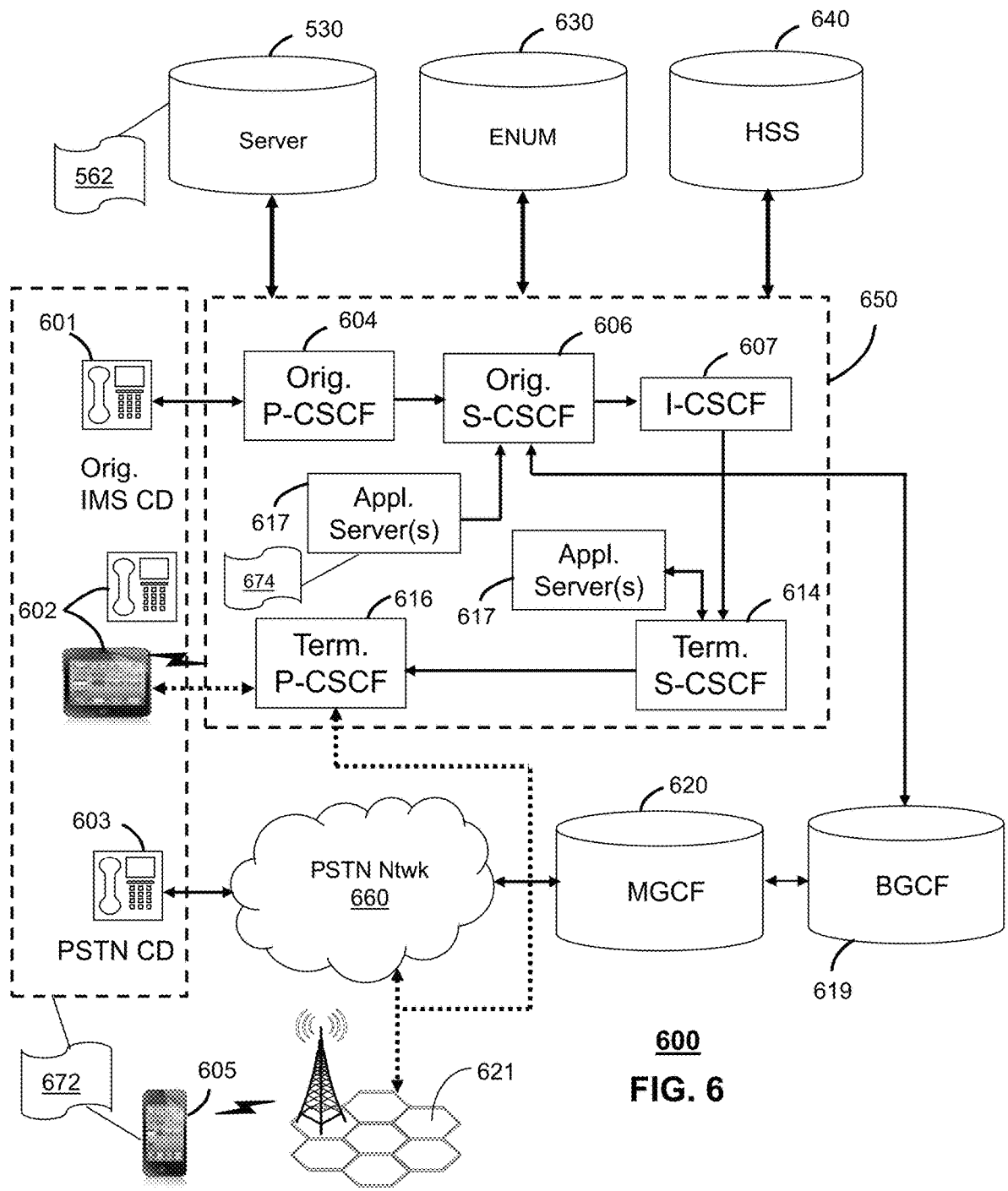

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with the multimedia presentation systems 100, 200, 300 of FIGS. 1, 2 and/or 3 and communication system 500 of FIG. 5, as another representative embodiment of the communication system 500. For instance, one or more devices illustrated in the communication system 600 of FIG. 6, such as the application server 674, can be used to decode first and second encoded audio portions extracted from a digitally encoded data stream to obtain first and second decoded audio portions, and to synchronize the first and second decoded audio portions to a decoded video portion of the stream based on a reference marker. The first decoded audio portion is forwarded, e.g., by the server 530 and/or the application server 617, to equipment of a first user, such as the a media, e.g., display, device, and the second decoded audio portion is forwarded to equipment of a second user, such as one or more of the remote or wireless communication devices 605. Presentations of the first decoded audio portion by the equipment of the first user and the second decoded audio portion by the equipment of the second user are synchronized to a presentation of the decoded video portion, e.g., when the remote devices are within a viewing distance of the display device.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 530 of FIG. 5 can be operably coupled to communication system 600 for purposes similar to those described above. The server 530 can perform one or more functions 562 and thereby providing audio and/or signal processing services to the CDs 601, 602, 603 and 605 of FIG. 6, similar to the functions described for server 530 of FIG. 5 in accordance with method 400 of FIG. 4. CDs 601, 602, 603 and 605, which can be adapted with software to perform one or more functions 672, such as audio selection, routing and/or presentation, to utilize the services of the alternative audio server 530, similar to the functions described for personal mobile devices 134, 234 of FIGS. 1 and 2, in accordance with method 400 of FIG. 4. The alternative audio server 530 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
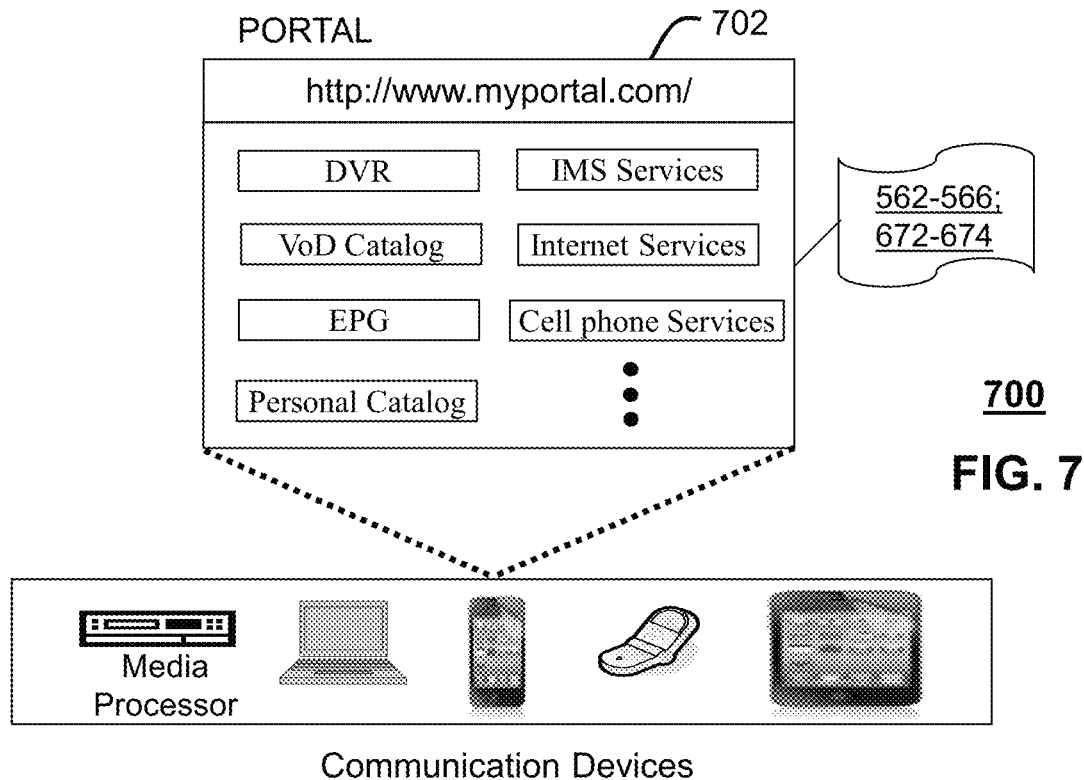
FIG. 7 depicts an illustrative embodiment of a web portal for interacting with the communication systems to support services of the multimedia presentation system of FIGS. 1-3.

FIG. 7 depicts an illustrative embodiment of a web portal 702 of a communication system 700. Communication system 700 can be overlaid or operably coupled with multimedia presentation systems 100, 200, 300 of FIGS. 1, 2, and/or 3, communication system 500 (FIG. 5), and/or communication system 600 (FIG. 6) as another representative embodiment of with multimedia presentation systems 100, 200, 300, the communication system 500, and/or the communication system 600. The web portal 702 can be used for managing one or more services of the multimedia presentation systems 100, 200, 300 and communication systems 500-600. A web page of the web portal 702 can be accessed by a Uniform Resource Locator (URL) with an Internet browser using an Internet-capable communication device such as those described in FIGS. 1, 2 and/or 3 and FIGS. 5-6. The web portal 702 can be configured, for example, to access a media processor 506 and services managed therefrom such as alternative audio services, a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, provisioning alternative audio services, and so on.

The web portal 702 can further be utilized to manage and provision software applications 562-566, and 672-674 to adapt these applications as may be desired by subscribers and/or service providers of systems 100, 200, 300 of FIGS. 1, 2 and/or 3, and communication systems 500-600. For instance, users of the services provided by server 617 or server 530 can log into their on-line accounts and provision the server 530 with a selection of an alternative audio for one or more multimedia programs. The selection can be in a context of provisioning alternative audio services that can be enabled, disabled, modified and so forth during operation, once provisioned. Alternatively or in addition, the selection can be to modify an alternative audio, e.g., adjusting one or more features such as a filtering, a volume, identification of a particular mix of sub-audio elementary streams, and so on. Service providers can log onto an administrator account to provision, monitor and/or maintain the systems 100, 200, 300 of FIGS. 1, 2 and/or 3 or server 530. For example, the services providers can access the media processors 116, 216, 316 to enable certain functionality, such as access to particular alternative audio streams. Such access can be managed by any suitable techniques, such as providing an encryption and/or licensing key to allow access to and/or decoding one or more of the elementary audio streams.

Figure 8:
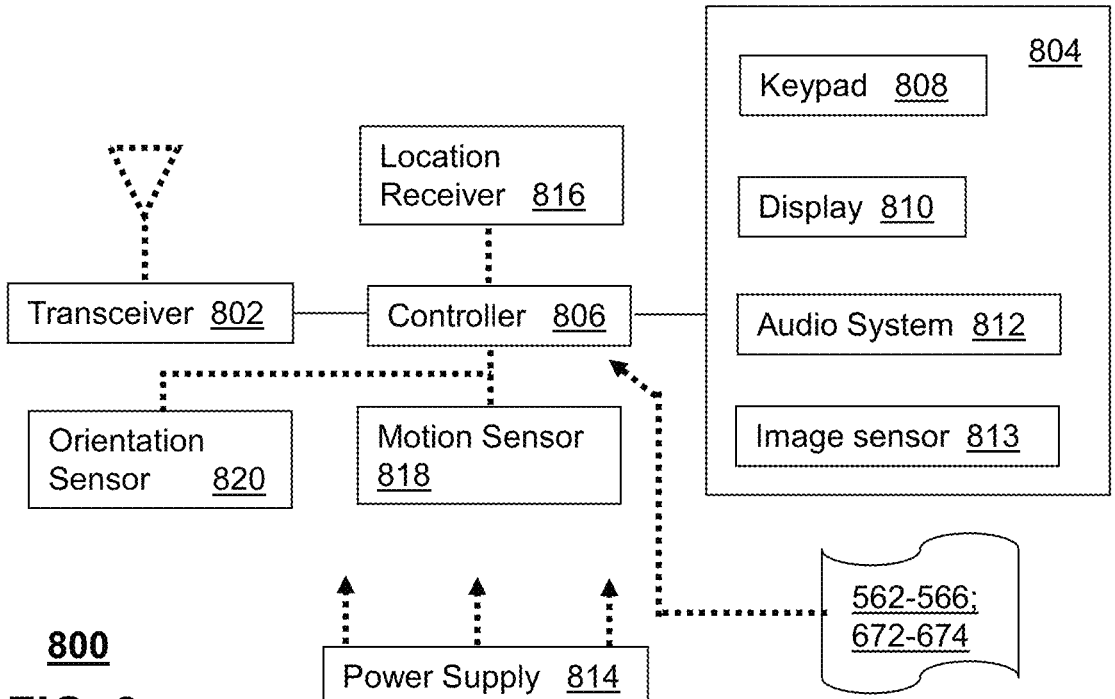
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 2 and/or 3, and FIGS. 5-6. The communication device 800 in whole or in part can represent any of the communication devices described in FIGS. 1, 2, 3 and 5-6 and can be configured to perform portions of the method for providing multiple simultaneous alternative audio of FIG. 4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the devices of FIGS. 1, 2 and/or 3, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in systems 100, 200, 300 of FIGS. 1, 2 and/or 3, communication systems 500-600 of FIGS. 5-6 such as a gaming console and a media player.

The communication device 800 shown in FIG. 8 or portions thereof can serve as a representation of one or more of the devices of system of FIGS. 1, 2 and/or 3, communication system 500, and communication system 600. In addition, the controller 806 can be adapted in various embodiments to perform the functions 562-566 and 672-674, respectively.

Upon reviewing the aforementioned embodiments, it would be evident to an artisan with ordinary skill in the art that said embodiments can be modified, reduced, or enhanced without departing from the scope of the claims described below. For example, the first decoded audio portion can include a first verbal portion and a first non-verbal portion, and the second decoded audio portion can include a second verbal portion and a second non-verbal portion, where one of the second verbal portion, the second non-verbal portion, or both differ from a corresponding one of the first verbal portion, the first non-verbal portion, or both according to a hearing impairment. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
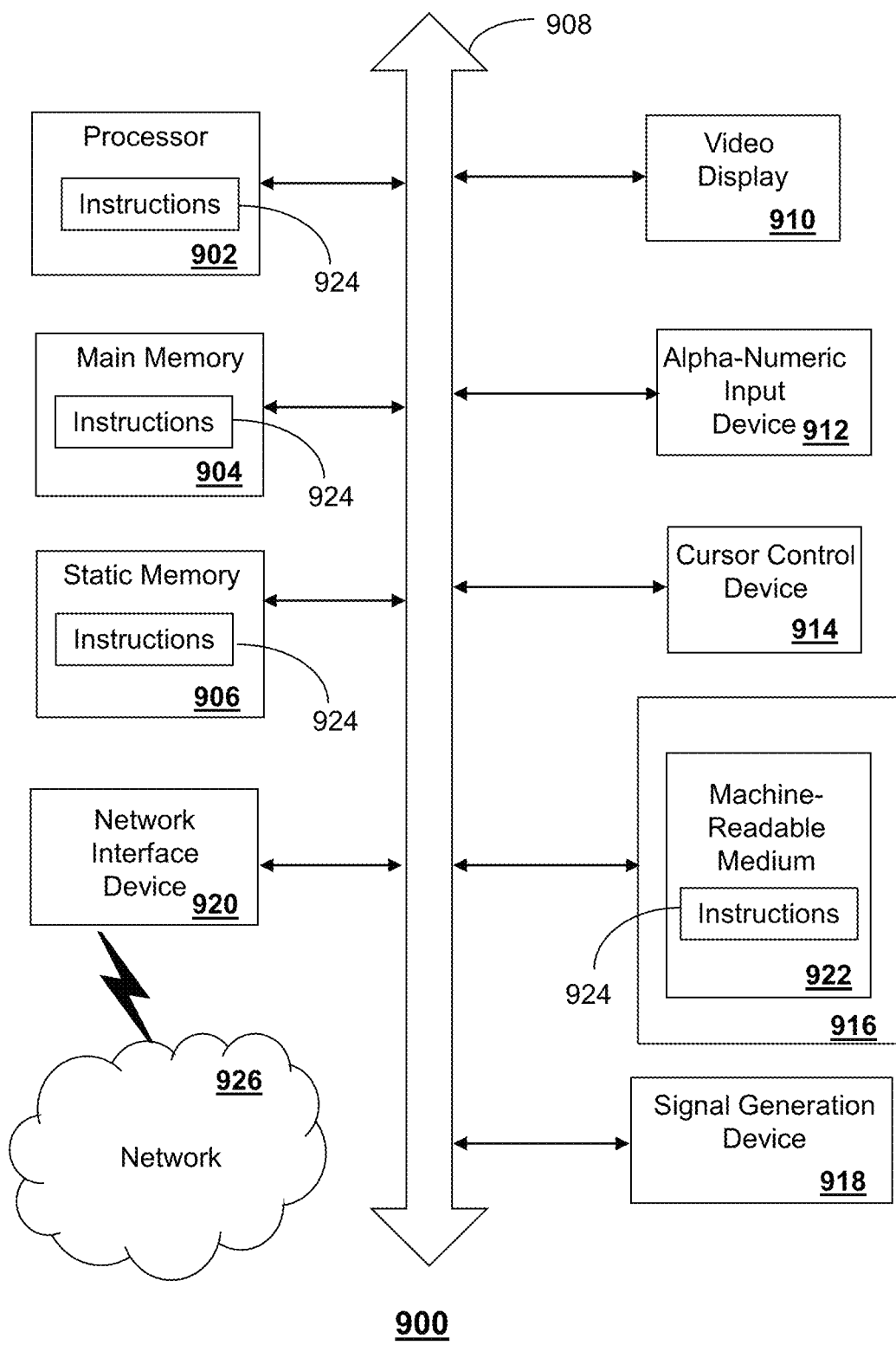
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the alternative audio server 530, the media processor 116, 216, 316, 506, the personal mobile device 134, 234, the directional audio system 324 and other devices of FIGS. 1-3 and FIGS. 5-8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device

920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   decoding, by a processing system including a processor, a first encoded audio portion of a plurality of encoded audio portions to obtain a first decoded audio portion, wherein the plurality of encoded audio portions and an encoded video portion are part of a data stream;
   decoding, by the processing system responsive to a selection, a second encoded audio portion of the plurality of encoded audio portions to obtain a second decoded audio portion;
   adjusting, by the processing system based on a determination of a timing error, a delay of the second decoded audio portion to obtain a delayed second decoded audio portion, wherein the determination of the timing error is between the first decoded audio portion and the second decoded audio portion, and wherein the timing error is determined based on monitoring synchronization markers in at least one of the first decoded audio portion or the second decoded audio portion; and
   forwarding, by the processing system, the first decoded audio portion and the delayed second decoded audio portion to an audio system,
   wherein a first audio presentation of the first decoded audio portion and a second audio presentation of the delayed second decoded audio portion by the audio system are synchronized to a video presentation of a decoded video portion obtained from the encoded video portion, and
   wherein the audio system directs the first decoded audio portion and the delayed second decoded audio portion to different spatial regions, and
   wherein the second audio presentation is acoustically isolated from the first audio presentation based on a first phasing of the first decoded audio portion and a second phasing of the delayed second decoded audio portion.

2. The method of claim 1, wherein the different spatial regions correspond to different portions of a viewing range of the video presentation.

3. The method of claim 1, wherein the first audio presentation and the second audio presentation comprise different languages.

4. The method of claim 3, further comprising detecting, by the processing system, a selection of an option corresponding to a language of the second audio presentation.

5. The method of claim 1, wherein the adjusting is performed by way of a feedback loop based on the timing error.

6. The method of claim 1, wherein the first audio presentation comprises at least one of dialog, a musical score, or background sounds of an original program.

7. The method of claim 6, wherein the second audio presentation comprises at least one of dialog, a musical score, or background sounds distinct from the original program.

8. The method of claim 1, further comprising detecting, by the processing system, a selection of an option corresponding to a presentation adapted for a person having a hearing impairment.

9. The method of claim 8, wherein the first decoded audio portion comprises a first verbal portion and a first non-verbal portion, and the delayed second decoded audio portion comprises a second verbal portion and a second non-verbal portion.

10. The method of claim 9, wherein one of the second verbal portion, the second non-verbal portion, or both differ from a corresponding one of the first verbal portion, the first non-verbal portion, or both according to the hearing impairment.

11. A device, comprising:
    a processing system including a processor; and
    a memory that stores executable instructions that, when executed by the processing system, facilitate performance of operations comprising:
    decoding a first encoded audio portion of a plurality of encoded audio portions to obtain a first decoded audio portion, wherein the plurality of encoded audio portions and an encoded video portion are part of a data stream;
    decoding, responsive to a selection, a second encoded audio portion of the plurality of encoded audio portions to obtain a second decoded audio portion;
    adjusting, based on a determination of a timing error, a delay of the second decoded audio portion to obtain a delayed second decoded audio portion, wherein the determination of the timing error is between the first decoded audio portion and the second decoded audio portion, wherein the timing error is determined based on monitoring synchronization markers in at least one of the first decoded audio portion or the second decoded audio portion, and wherein the adjusting is performed by way of a feedback loop based on the timing error; and forwarding the first decoded audio portion and the delayed second decoded audio portion to an audio system,
- wherein a first audio presentation of the first decoded audio portion and a second audio presentation of the delayed second decoded audio portion by the audio system are synchronized to a video presentation of a decoded video portion obtained from the encoded video portion, and
- wherein the second audio presentation is acoustically isolated from the first audio presentation based on a first phasing of the first decoded audio portion and a second phasing of the delayed second decoded audio portion.

12. The device of claim 11, wherein the audio system directs the first decoded audio portion and the delayed second decoded audio portion to different spatial regions corresponding to different portions of a viewing range of the video presentation.

13. The device of claim 11, wherein the first audio presentation and the second audio presentation comprise different languages.

14. The device of claim 13, wherein the operations further comprise detecting a selection of an option corresponding to a language of the second audio presentation.

15. The device of claim 11, wherein the operations further comprise detecting a selection of an option corresponding to a presentation adapted for a person having a hearing impairment.

16. A non-transitory machine-readable medium comprising executable instructions that, when executed by a processing system including a processor, facilitate performance of operations comprising:
- decoding a first encoded audio portion of a plurality of encoded audio portions to obtain a first decoded audio portion, wherein the plurality of encoded audio portions and an encoded video portion are part of a data stream;
- decoding, responsive to a selection, a second encoded audio portion of the plurality of encoded audio portions to obtain a second decoded audio portion;
- adjusting, based on a determination of a timing error, a delay of the second decoded audio portion to obtain a delayed second decoded audio portion, wherein the determination of the timing error is between the first decoded audio portion and the second decoded audio portion, and wherein the timing error is determined based on monitoring synchronization markers in at least one of the first decoded audio portion or the second decoded audio portion; and
- forwarding the first decoded audio portion and the delayed second decoded audio portion to an audio system,
- wherein a first audio presentation of the first decoded audio portion and a second audio presentation of the delayed second decoded audio portion by the audio system are synchronized to a video presentation of a decoded video portion obtained from the encoded video portion, and
- wherein the second audio presentation is acoustically isolated from the first audio presentation based on a first phasing of the first decoded audio portion and a second phasing of the delayed second decoded audio portion.

17. The non-transitory machine-readable medium of claim 16, wherein the audio system directs the first decoded audio portion and the delayed second decoded audio portion to different spatial regions corresponding to different portions of a viewing range of the video presentation.

18. The non-transitory machine-readable medium of claim 16, wherein the first audio presentation and the second audio presentation comprise different languages.

19. The non-transitory machine-readable medium of claim 18, wherein the operations further comprise detecting a selection of an option corresponding to a language of the second audio presentation.

20. The non-transitory machine-readable medium of claim 16, wherein the operations further comprise detecting a selection of an option corresponding to a presentation adapted for a person having a hearing impairment.

\* \* \* \* \*